Feb. 24, 1953　　J. L. BARKER　　2,629,865
RADIO ECHO APPARATUS FOR DETECTING AND
MEASURING THE SPEED OF MOVING OBJECTS
Filed June 13, 1946　　　　　　　　　　　　2 SHEETS—SHEET 1
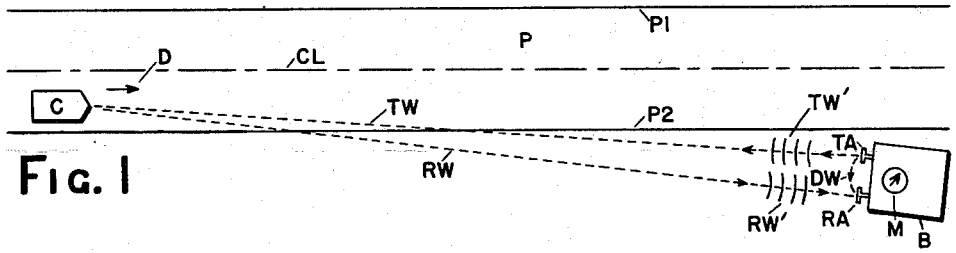
FIG. 1
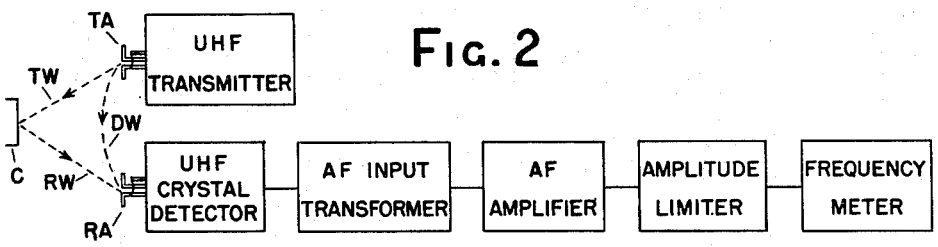
FIG. 2
FIG. 5
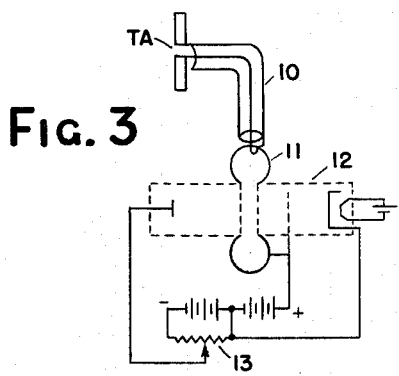
FIG. 3
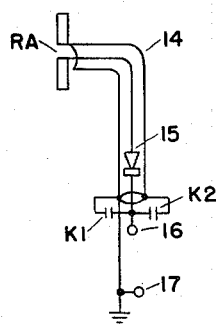
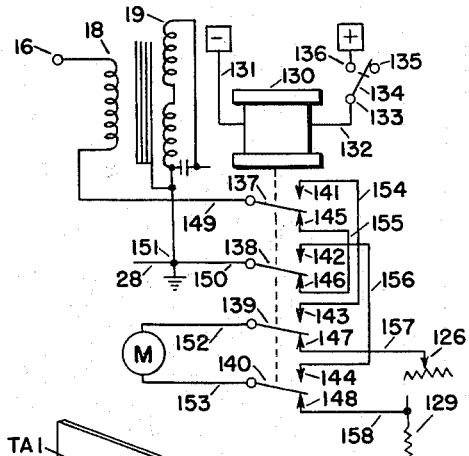
FIG. 8
INVENTOR
JOHN L. BARKER
BY
Edward H. Eames
ATTORNEY Feb. 24, 1953  J. L. BARKER  2,629,865
RADIO ECHO APPARATUS FOR DETECTING AND
MEASURING THE SPEED OF MOVING OBJECTS
Filed June 13, 1946                              2 SHEETS—SHEET 2
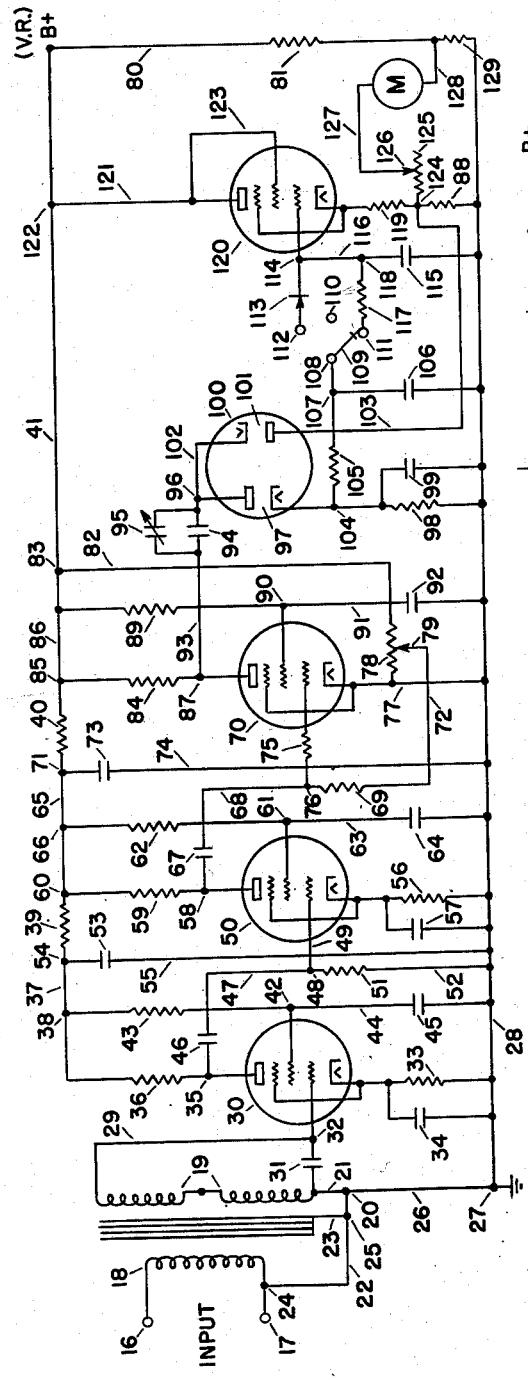
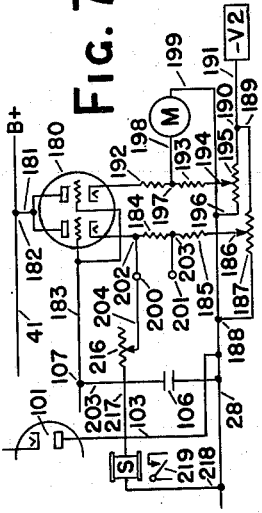
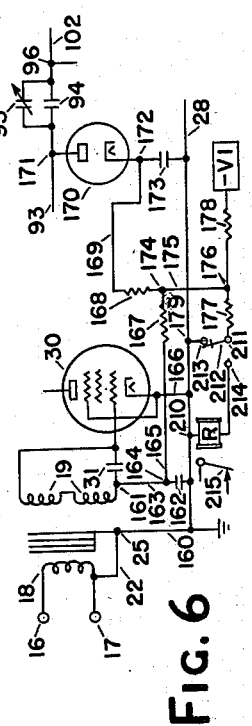
INVENTOR
JOHN L. BARKER
BY *Edward W. Eames*
ATTORNEY Patented Feb. 24, 1953

2,629,865

UNITED STATES PATENT OFFICE 2,629,865

RADIO ECHO APPARATUS FOR DETECTING AND MEASURING THE SPEED OF MOVING OBJECTS

John L. Barker, Norwalk, Conn., assignor, by mesne assignments, to Eastern Industries, Incorporated, a corporation of Delaware Application June 13, 1946, Serial No. 676,401

23 Claims. (Cl. 343—8)

This invention relates to a device for detecting and measuring the speed of moving bodies and is particularly adapted to measuring the speed of bodies moving along a substantially predetermined path by remote detection from an observation point or test station at which the device may be located adjacent to such path.

A preferred application of the invention is the measurement of speed of vehicles or vehicle traffic on roadways such as streets and highways. The invention also has application in measurement of the speed of railway vehicles or trains proceeding along a railroad track, and in measurement of the speed of other traffic elements proceeding along a traffic way generally.

A further application of the invention is in detecting the presence of a moving vehicle over some range of travel distance along a traffic path from a point adjacent such path by remote detection.

A preferred embodiment of the invention is illustrated and described herein with particular reference to its preferred use in the detection and measurement of the speed of vehicles on a roadway, although it will be understood that the invention is not limited solely to such use.

According to the present invention a beam of microwaves or radio waves of ultra high frequency is directed along the path of movement of the vehicle in the roadway toward the vehicle from a test station adjacent to the roadway, and a small part of such microwaves reflected from the vehicle are received back at the test station. The reflected waves are mixed with the transmitted waves by the apparatus in accordance with the invention to provide a beat frequency which is directly proportional to the speed of the vehicle along its path. As a speed meter this beat frequency is applied to a frequency meter calibrated to provide a direct reading of speed. As a detector of a moving vehicle the beat frequency is applied to a threshold response device to provide an output indication only for a vehicle having appreciable speed. The length of travel of the microwaves from the test station to the moving vehicle and back along the beams of transmitted and reflected waves is progressively changing at a time rate depending on the speed of the vehicle, and since the reflected waves received at the apparatus are delayed by the time required for this length of travel there is a progressively varying time lag between the transmitted waves at the apparatus and the delayed reflected waves received there, and thus there is periodic interference at the apparatus between the transmitted and reflected waves which produces a beat frequency proportional to the speed of the moving vehicle.

This speed meter is of particular significance in the measurement of speed of vehicles along streets and highways in that it offers an opportunity to determine the speed remotely without any obvious evidence of its presence to the drivers of the vehicles. This enables traffic authorities to obtain truly representative speed information without the distortion of results that frequently occurs when drivers slow down on seeing some checking device in or across the road.

In the past various devices have been employed for checking the speed of highway traffic by the elapsed time between the successive interruption of two spaced light beams across the roadway for example, or by similarly checking the elapsed time between actuations of two contact switches at predetermined spacing along the roadway. In some instances in the prior art pneumatic tubes across the roadway have been employed to operate switches in response to the change in pressure occurring on the passage of a vehicle wheel over the tube, the tubes being spaced at a predetermined distance so that the speed can be checked by the elapsed time between actuations of the successive tubes. Such earlier devices in the prior art have the disadvantage that they present some visible evidence to the traffic of the presence of some device which causes many drivers to hesitate or change their speed so that a true determination cannot be obtained of the normal speeds of vehicles.

Such prior devices also have the disadvantage of requiring a substantial installation to properly space and correlate the roadway tubes or contact switch elements or light beams, and it is most difficult with such devices to avoid disturbance of the spaced elements over any period of time by passing traffic, unless a permanent installation is made. The present device on the other hand is very compact and light in weight and can be located entirely at one side of the road. It does not therefore expose any elements to the wear and tear of traffic, it does not provide any obvious evidence of its presence to traffic and it can serve as a completely portable device which can be easily moved from one test location to another and is ready to operate without any interference with traffic and without any elaborate set up.

A further advantage of the present invention is that it reads the speed of vehicles directly and does not depend on the measurement of the elapsed time between two points along the roadway, so that its speed indication is not distorted when one vehicle passes another for example. In the case of prior devices employing spaced actuating elements it is obvious that when one car passes another the time elapsing between actuations of the actuating elements by the interfering vehicles will be confused between the two vehicles so that no clear determination of speed can be obtained of either of the vehicles. In the case of the present invention however the speed indication normally is given for the nearest of the vehicles as the one which produces the strongest signal to the meter.

A general object of this invention is to provide an improved device for measuring the speed of moving vehicles or other bodies.

Another object of the invention is to provide a device for measuring the speed of vehicles or other bodies moving along a substantially predetermined path or roadway by remote detection from a test station adjacent to such path or roadway.

A further object is to provide a speed meter employing as an indication of speed the beat frequency between microwaves transmitted from such meter toward a moving vehicle or other moving body substantially along a path of movement and some of such microwaves reflected from such vehicle or body and received at such meter.

Another object of the invention is to provide a device for detecting the presence of a vehicle moving with appreciable speed along a traffic path by employing as an indication of such speed the beat frequency obtained by mixing microwaves transmitted along such path toward such vehicle and some of such microwaves reflected from such vehicle.

Another object is to provide a speed meter for vehicle traffic which will indicate at any one time the speed of the one vehicle having the greatest effect on the meter among several vehicles traveling along a traffic path.

Another object is to provide a speed meter for vehicle traffic for indicating continuously over a considerable range of travel along a traffic path the speed of a single vehicle in the absence of other vehicles, and for indicating at any one time the speed of only one of two or more vehicles passing concurrently on such path.

A further object of the invention is to provide for vehicle traffic a speed meter of simple, compact design, readily portable and capable of direct reading of vehicle speed by remote detection from the roadside without interference with traffic.

Reference is now made to the accompanying drawings illustrating embodiment of the invention and in which:

Fig. 1 is a plan view of a roadway with a speed meter at the roadside and showing the relation of the speed meter to an approaching vehicle, in accordance with one form of the present invention.

Fig. 2 is a block diagram of the electrical components of one form of speed meter in accordance with the invention.

Fig. 3 is a schematic diagram of one form of microwave oscillator and transmitting and receiving antennas and mixer for the transmitted and reflected microwaves, comprising the ultra high frequency detection unit of the speed meter.

Fig. 4 is a schematic circuit diagram of one form of amplifier-limiter and frequency meter for the beat frequency obtained from mixing the transmitted and reflected microwaves in the apparatus of Fig. 3.

Fig. 5 is a schematic diagram of a modification of the circuit of Fig. 4 to provide a switching arrangement for employment of the same indicating meter alternatively for testing microwave signal strength and for speed measurement.

Fig. 6 shows another modification of the circuit of Fig. 4 to provide a more sustained speed indication signal in the presence of momentary variations in the strength of the reflected waves received from a vehicle as it travels along its path, and to provide a circuit serving as a detector of the presence of a moving vehicle.

Fig. 7 shows another modification of the circuit of Fig. 4 particularly in the output stage connected with the indicating meter and providing output terminals for connection to a relay or other device, such as a recording instrument for continuous recording of the speed indications if desired, and showing a relay connected to certain of the output terminals for indication of speed in relation to a predetermined speed level, if desired, or for detection of presence of a moving vehicle if desired.

Fig. 8 shows one form of directive antenna arrangement which may be employed.

Referring now to Fig. 1, upper and lower horizontal lines P1 and P2 represent the two edges of a roadway P for vehicular traffic for example. For the purpose of showing one form of applying the invention to an ordinary roadway carrying two way vehicular traffic the center line CL of the roadway is shown by the broken line along middle of the roadway. A car or vehicle C is illustrated at the left side of the figure proceeding to the right as shown by the arrow D along the lower part of the roadway below the center line CL. At the lower right side of Fig. 1 the speed meter assembly is illustrated schematically by the box B, having a transmitting antenna TA and a receiving antenna RA and a meter M indicating to an observer the speed of the approaching vehicle C.

The box B contains an ultra high frequency radio oscillator for generating microwaves and supplying these waves to the transmitting antenna TA, and also contains a receiving and indicating apparatus for translating microwave energy received by the receiving antenna RA into an electrical output readable by the meter M to indicate speed.

For convenience of illustration in Fig. 1 the box B and antennas TA and RA have been shown greatly enlarged and it has been assumed that the complete speed meter assembly is contained in the box B, but it may be desirable for practical purposes to separate the assembly into two or more subassemblies in separate boxes, such as for example having the ultra high frequency oscillator and receiver and the antennas in one unit and the indicator circuit apparatus and meter M in another box as a separate unit but connected to the ultra high frequency unit by appropriate cable, and it may also be desirable to separate the power supplies. It will therefore be understood that the box B represents schematically one or more containers for the complete speed meter, and that the complete speed meter is preferably much smaller than indicated in Fig. 1. It will be readily portable and will ordinarily be of the size of a suitcase or traveling bag for example.

The transmitting antenna TA is preferably arranged to transmit a relatively narrow beam of microwaves TW and TW' along the roadway from the speed meter toward the approaching vehicle C. A small part of the microwaves TW which are directed toward the vehicle are reflected from the vehicle and some of these reflected waves are returned along the line of waves RW and RW' to the receiving antenna RA. The transmitted and reflected microwaves are schematically indicated in part respectively by the small lines marked TW' and RW' without regard to their size or spacing. The reflected waves are mixed at the receiver at box B with the transmitted waves to provide a beat frequency which is proportional substantially to the speed of the vehicle approaching along the road P. This beat frequency is translated in the indicator circuit in the box B to be read by the meter M directly in miles per hour speed for example.

The reflected waves RW preferably are mixed with only a small part DW of the transmitted waves TW, obtained by direct transmission for example as shown in the dotted line DW in Fig. 1. The antennas TA and RA are preferably arranged in end to end alignment or by other well known methods of alignment or shielding so that very little of the energy of the microwaves passes from the transmitting antenna directly to the receiving antenna. Thus this direct energy is more nearly of the same order of magnitude as the low energy of the reflected waves received at the receiving antenna RA, and permits the apparatus to be better balanced electrically.

It will be appreciated that other means of mixing a part of the transmitted wave energy with the received reflected wave energy may be employed, as for example by passing a part of the generated microwave energy inside of the speed meter through a loss line before mixing it with the received wave energy, and that the showing of Fig. 1 is only illustrative. Furthermore under certain conditions of highly concentrated beams of microwaves and short distance of beam length it may be possible to combine the transmitting and receiving antennas and employ only one antenna in common for both functions, and it will therefore be understood that the showing of the drawings in this respect also is only illustrative.

Fig. 2 shows a block diagram illustrating schematically the principal electrical circuit parts of one form of speed meter in accordance with the invention. The block marked UHF Transmitter represents a generator of ultra high frequency waves or microwaves, with such generator feeding such waves to the transmitting antenna TA, which in turn directs the waves along the line TW to have a portion of such waves reflected from the vehicle C along the line RW to the receiving antenna RA. Also illustrated is the small amount of direct waves DW directly transmitted from the transmitting antenna to the receiving antenna.

The microwave energy received by the receiving antenna RA is passed through an ultra high frequency crystal detector shown by the block so designated in the block diagram. The crystal detector detects the beat frequency component from the mixture of the ultra high frequency transmitted and received waves.

The microwave output of the ultra high frequency transmitter is preferably of a constant frequency and steady amplitude within a frequency range of 1,000 to 12,000 megacycles for example. With microwaves on a constant frequency within this range the beat frequency is in the audio frequency range and can be readily handled by ordinary audio frequency amplifier circuits. For example with a transmitted frequency of 3000 megacycles the beat frequency will range from 0 to 700 cycles approximately for a vehicle speed of 0 to 75 miles per hour.

The audio frequency output of the UHF crystal detector in Fig. 2 is fed to an AF input transformer and then to an AF amplifier and amplitude limiter. The latter reduces the effect of amplitude changes in the received microwave signal or beat frequency signal and emphasizes the audio beat frequency so that the output of the amplitude limiter is a signal having the beat frequency and a substantially constant amplitude. This output is fed to the frequency meter shown in the last block in Fig. 2 which measures the beat frequency and thus provides a measurement of the speed of the vehicle C since the beat frequency is a direct function of the speed.

Fig. 3 illustrates schematically one form of the transmitting and receiving antennas TA and RA in collinear alignment in order to provide only a small amount of direct transmission of wave energy from the transmitting to the receiving antenna. In Fig. 3 the transmitting antenna is shown connected by means of a coaxial cable 10 to an ultra high frequency oscillator which may be of the reflex klystron tube type or of the lighthouse tube type for example employing a tuned cavity 11 operatively connected with the ultra high frequency radio tube 12 and its power supply 13.

The receiving antenna RA is shown in the lower part of Fig. 3 connected by the coaxial cable 14 to the terminals 16 and 17 through the crystal detector 15. The center conductor of the coaxial cable is preferably connected to the crystal detector and terminal 16, and the outer conductor is preferably connected to ground at the terminal 17. The usual coaxial cable fitting for the crystal detector 15 ordinarily provides a small amount of capacity suitable for the ultra high frequency range connected between the outer and inner conductors of the coaxial cable as shown schematically as capacitors K1 and K2 in Fig. 3.

It will be appreciated that the transmitting and receiving antennas TA and RA are shown schematically and are preferably backed by a reflector one quarter wave length behind the antennas and also may employ multiple antenna elements in the form of an array as is well known to those skilled in the art in order to make the antennas more directional and in the case of the transmitting antenna to provide a more concentrated beam.

It will also be appreciated by those skilled in the art that hollow wave guides may be employed in place of the coaxial cable, and that horns connected to the wave guides with the latter provided with suitable antenna stubs may be used in place of the dipole antennas illustrated in Fig. 3 for the transmitting and receiving antennas. It will similarly be further appreciated by those skilled in the art that any of the dipole antennas may be placed at the focus of a parabolic reflector in order to obtain beam concentration or a more concentrated beam sensitivity if it is desired, and also that an ultra high frequency lens of the multiple transverse metal slat type across the microwaves near their source may be used as another means to concentrate the beam.

It will therefore be understood that the showing of the ultra high frequency elements in Figs. 1, 2, 3 for example is merely illustrative and any of the several forms well known could be employed without departing from the spirit of the invention as defined by the claims.

Referring now to Fig. 4 appearing in the second sheet of drawings there is illustrated one form of indicator circuit for translating the beat frequency output of the ultra high frequency detector apparatus into a readable indication of the speed of the vehicle.

The indicator circuit preferably uses an audio frequency transformer 18—19 shown at the left side of Fig. 4 for matching the output of the crystal detector 15 (of Fig. 3) at terminals 16 and 17 to the input of the amplifier stages represented by pentode tubes 30 and 50 in Fig. 4, which in turn drive an amplitude limiter represented by tube 70 and a frequency meter, represented by the capacitors 94—95, the dual diode 100, the load resistor 98, the cathode follower tube 120 and the meter M.

The input winding 18 of the input transformer is connected across terminals 16 and 17 and the lower side of the input winding is connected to terminal 17 and is also connected at junction 24, via wire 22, junctions 25 and 20, and wire 21 to the lower side of the output winding 19, which is in turn connected by wire 21, junction 20, wire 26 to ground at junction 27 on wire 28. The core of the transformer is preferably also connected to the wire 22 by means of wire 23 at junction 25, so that the core will be grounded with the lower sides of the input and output as previously described.

A constant voltage D. C. power supply for the anode-cathode circuits of the several tubes of the amplifier is preferably voltage regulated and is shown in the upper right hand corner of Fig. 4 as B+ (V. R.) connected to wire 41 running along the top of Fig. 4.

The output winding 19 of the audio transformer is connected across capacitor 31 by wire 29 at junction 32, and the output of this transformer is applied to the control grid of the first of the two pentode tube amplifier stages at the junction 32. The first and second amplifier pentodes 30 and 50 are resistance-capacity coupled, and for detection of the speed of ordinary highway traffic would be designed for an audio frequency range of 6 to 240 cycles for an ultra high frequency of 1000 megacycles, or for an audio frequency range of 70 cycles to 3000 cycles for an ultra high frequency of 12,000 megacycles for example. For 3000 megacycles UHF the amplifier would be designed for 18 to 720 cycles for example. This would provide for a traffic speed range of two to seventy-five miles per hour, but it will be understood that a higher speed range could be provided if desired.

The output of the transformer 18—19 is applied to the control grid input of the first pentode tube 30 at junction 32. The cathode of tube 30 is connected to the suppressor grid and is connected to the ground wire 28 through resistor 33 and parallel capacitor 34. The anode of tube 30 is connected to the B+ wire 41 via resistor 36, wire 37, resistor 39, wire 65, resistor 40, wire 86, to wire 41 at junction 83.

The screen grid of tube 30 is connected at junction 42 between resistor 43 and capacitor 45 which are connected in series by wire 44 between wire 37 at junction 38 at the top of Fig. 4 and wire 28 at the bottom of Fig. 4. Capacitor 46 and resistor 51 are connected between the anode of tube 30 at junction 35 and ground at wire 28 as follows: from junction 35 through capacitor 46, wire 47, junction 48, resistor 51, wire 52 to wire 28.

A filter capacitor 53 is connected across the D. C. power supply at this point from junction 54 on wire 37, via capacitor 53, wire 55 to the ground wire 28. The amplified beat frequency output of tube 30 is applied to the control grid of the second amplifier tube 50 from the junction 48 via wire 49. The cathode of tube 50 is connected to ground wire 28 through resistor 56 and parallel capacitor 57, and is also connected in the usual fashion to the suppressor grid of the tube 50.

The anode of tube 50 is connected via resistor 59 to the D. C. power supply via junction 60, wire 65, resistor 40, wire 86 to wire 41 at junction 83. The screen grid of tube 50 is connected at junction 61 between resistor 62 and capacitor 64 which are connected in series across the power supply as follows: resistor 62 is connected between junction 66 on wire 65 at the top of Fig. 4 and junction 61, and capacitor 64 is connected from junction 61 via wire 63 to ground wire 28. Filter capacitor 73 is connected across the D. C. power supply at this point from junction 71 on wire 65, via capacitor 73, wire 74 to ground wire 28.

The anode of tube 50 is connected at junction 58 via capacitor 67, wire 68, junction 76, resistor 69, wire 72, to tap 79 on potentiometer 78, which is connected across the D. C. power supply from wire 41 at junction 83, via wire 82, potentiometer 78, wire 77, to ground wire 28.

The output of the second amplifier stage from tube 50 is taken from junction 76 via resistor 75 to the control grid of the limiter tube 70, which is preferably of the pentode type as shown. The limiter operates with grid limiting for the positive half of the signal, the excess signal above the point of zero bias with respect to the cathode being lost in the voltage drop across the grid resistance 75. The negative half of the input voltage cuts off the plate current by negative grid bias and the plate potential rises to the full D. C. power supply potential. The plate voltage during the positive half of the cycle drops to a constant low voltage with respect to ground thereby giving a limited constant total output excursion in the plate circuit of the limiter of a rectangular wave form whose fundamental frequency is the frequency of the applied beat frequency signal to the input of the limiter.

The cathode of the limiter tube 70 is connected via wire 77 to ground wire 28 and is also connected to its suppressor grid. The anode of the limiter tube 70 is connected at junction 87 via resistor 84 to junction 85 on wire 86, and thence at junction 83 to wire 41 of the D. C. power supply.

The screen grid of the limiter tube 70 is connected at junction 89 between resistor 89 and capacitor 92, which are connected in series across the D. C. power supply from wire 86 through resistor 88, junction 90, wire 91, and capacitor 92 to ground wire 28.

The rectangular wave output of the limiter is applied from the anode of the limiter 70 at junction 87 via wire 93 to a frequency counting circuit which consists essentially of one or more capacitors 94—95, a load resistor 98 and diodes 97 and 101.

The number of times per second the capacitor pair 94—95 is charged through the load resistor 98 will produce a current according to the formula $I=NCE$, where I is the current through the resistor, N is the number of times per second the capacitor is charged through the resistor, C is the capacitance of the capacitor and E is the potential applied to the capacitor.

One side of the capacitor pair 94—95 is connected via wire 93 and junction 87 to the anode of the limiter tube 70. The resistance of the plate circuit of the limiter is very small compared to other resistance in the circuit and therefore this side of the capacitor pair can be periodically raised and lowered through the peak to peak voltage range of the rectangular wave output of the limiter at the rate of the fundamental frequency. The other side of the capacitor pair 94—95 is connected at junction 96 to the anode of a diode 97, whose cathode is connected via a load resistor 98 and parallel capacitor 99 to ground wire 28. The capacitor 95 is preferably of the adjustable type and connected across capacitor 94 in order to adjust the frequency counting circuit.

During the positive excursion of approximately one half cycle of the fundamental frequency of the rectangular wave output of the limiter sufficient time elapses to completely charge the capacitor pair 94—95. A second diode 101 is connected to the load side of the capacitor pair 94—95 so that during the negative excursion in the plate circuit of the limiter the capacitor pair is discharged to a predetermined level. A further description of this level to which the discharge takes place will be included later.

As shown in Fig. 4 the second diode 101 has its cathode connected to junction 96 via wire 102, and has its anode connected via wire 103 to junction 124 between resistors 119 and 88 which are in series between the cathode of the output stage tube 120 and the ground wire 28. The two diodes may be contained in separate tube envelopes or a common envelope, schematically indicated by the circle 100.

From the foregoing description it will be apparent that the capacitor pair 94—95 is alternately charged and discharged, the charging taking place through diode 97 and load resistor 98 and the discharge taking place through the diode 101 and resistor 88. The average current through the load resistor 98 is proportional to the number of times per second the capacitor pair is charged. The average voltage across the resistor 98 is therefore proportional to the frequency of the received signal and to the speed of the oncoming vehicle.

A cathode follower is convenient for matching this frequency counting circuit to a meter to indicate the change in the voltage of the load resistor 98 in the frequency measuring circuit. The system is calibrated so that the indication on the meter M in the cathode follower circuit of the output device is calibrated directly in miles per hour for example.

In the cathode follower circuit the voltage across the load resistor 98 is applied to the control grid of pentode tube 120 from junction 104 at the cathode of diode 97, via resistor 105, junction 107, the pivot terminal 108 of switch 109, terminal 111, resistor 117, junction 118, wire 116, to junction 114 at the control grid. The switch 109 is a three position switch which is shown in Fig. 4 in its lowermost position in contact with terminal 111. The switch also has an upper terminal 112 and a middle terminal 110, the latter terminal providing an off position for the switch.

This switch is provided for the purpose of enabling the operator who is taking the speed measurements to control how long the speed indication for any given vehicle will be held on the output meter M. In some cases it may be desirable to have the speed meter read the speed indication of any vehicle coming within range of the speed meter and to show its speed reading only while the vehicle is intercepting the microwave beam and thereafter drop off promptly to a zero indication until another vehicle arrives in the beam. In such cases the switch 109 will be placed in the lower position as shown so as to bridge the terminals 108 and 111.

In other cases however it may be desirable that the speed indication for any given vehicle be held for some time after the passage of the vehicle for recording purposes, so as to permit the operator to mark down the speed indication. In such cases the output meter will indicate the maximum speed which was reached for the single vehicle which was being observed and with the switch 109 in its upper position bridging terminals 108 and 112 the speed meter will hold this speed indication for several seconds for example without appreciable change or loss of the speed indication value. With the latter arrangement the operator, after having recorded the speed, would turn the switch 109 from its upper to its lower position momentarily in order to prepare the speed meter for its next speed reading.

In the upper position of switch 109 the output of the voltage across the load resistor 98 is applied at terminal 112 via rectifier 113 to the control grid of the cathode follower tube 120 at junction 114. A capacitor 115 is connected also to junction 114 between the control grid at the ground wire 28 via wire 116 and junction 118. In each case it will be noted that capacitor 106 is connected between the right side of resistor 105 at junction 107 and the ground wire 28. With this switching arrangement the capacitor 115 is charged to follow the voltage across the load resistor 98 which represents the frequency, and in the upper position of switch 109 at terminal 112 this capacitor maintains its charge after the charging voltage across the load resistor 98 has dropped off again due to the passage of a vehicle. However if the switch 109 is in its lower position at terminal 111 the capacitor 115 is discharged after the passage of the vehicle via resistor 117 and resistors 105 and 98.

It was previously mentioned that the anode of the diode 101, which was connected to the frequency measuring capacitors 94—95 and which served to discharge this capacitor during the negative excursion of the voltage of the limiter tube 70, was connected to a reference potential. This reference potential is part of the output voltage available at the cathode of the cathode follower tube 120. The voltage across the load resistor 98 is exponential for large changes; however the beginning of the voltage curve is very nearly linear. By discharging the frequency measuring capacitors 94—95 with voltage from the cathode follower at junction 124 the linearity can be greatly improved since the frequency measuring capacitor will then be charged and discharged through the same difference of potential for each cycle of the limiter output.

The anode of the cathode follower tube 120 is connected via wire 121 to the D. C. supply at junction 122 on wire 41. The anode is also connected to the screen grid of tube 120 via wire 123. The cathode is connected to the suppressor grid.

The meter M is connected to read the voltage across resistance 88 in the cathode circuit of the cathode follower tube 120 by connection of the meter M from junction 124 via variable resistor 125 and tap 126, wire 127, meter M, wire 128, to a point between resistors 81 and 129 forming a potentiometer across the D. C. power supply. These resistors are connected from the B+ wire 41, via wire 80, resistor 81, resistor 129 to ground wire 28. Thus the meter M is connected at its right side by wire 128 to a potential somewhat above ground as determined by the relative size of resistors 129 and 81. This is for the purpose of balancing any voltage appearing across resistor 88 in the absence of any moving vehicle so that the meter will read zero under such conditions. Since the voltage across resistor 88 is proportional to the beat frequency as translated by the frequency measuring circuit and applied to the cathode follower tube 120 as previously described the meter M can be calibrated in miles per hour for example corresponding to the voltage values across resistor 88 corresponding in turn to the incoming beat frequency and to the speed of the vehicle.

The indicator circuit of Fig. 4 is provided with a threshold control or minimum signal response control which will now be described. Associated with the control grid circuit of the limiter tube 70 is threshold control contact arm 79 of potentiometer 78, which determines the amount of positive voltage acting in the grid circuit of said tube. Setting this contact to a positive potential causes a voltage drop in resistor 75 because of the conducting property of the grid. The potential at junction 76 will assume some proportion of the potential to which arm 79 of potentiometer 78 is connected. Signals now coming from amplifier tube 50 and being transmitted through capacitor 67 must have sufficient amplitude to overcome the voltage drop across resistor 75 before the voltage at the grid of tube 70 can change from a very slight positive value to some negative value and thereby cause the output of the limiter tube to change. The higher the positive voltage on threshold control contact arm 79 the higher the voltage drop across resistor 75 and therefore the larger the signal which must be received from the amplifier 50 before any signal appears in the output of the limiter. Resistor 69 is in the series circuit to allow a relatively high impedance path for the signal. Normally the threshold control is set such that in the quiescent state of the speed meter in absence of appreciable incoming beat frequency signal as in the absence of nearby moving vehicles for example, any amplitude changes from extraneous noises will be lost at the grid circuit resistor 75 of the limiter. When the desired signal exceeds the quiescent state noise signals however the threshold blocking will no longer be large enough to hold the grid at nearly zero potential and therefore the signal voltage will cause the limiter to operate in a normal manner. It will be appreciated that this threshold control can be set for any desired threshold signal level for the incoming beat frequency signal at which the indicator circuit will provide an output indication and thus the indicator circuit can also serve as a speed detector, or moving vehicle detector.

Referring now to Fig. 5 a modification of the circuit of Fig. 4 is illustrated to provide a switching arrangement for use of the meter M alternatively for reading speed and for reading the microwave output signal of the transmitter in order to test the apparatus in the absence of vehicular traffic for example or in setting the apparatus up initially at a location.

This switching arrangement in Fig. 5 includes a relay 130 controlled by a switch 134 to change the connections of the input transformer 18—19 and the meter M in the circuit of Fig. 4 or modified by Fig. 5. The relay 130 has its operating coil 130 connected across a power supply indicated by minus and plus in squares, the operating circuit running from the minus power supply terminal via wire 131, relay coil 130, wire 132, pivot terminal 133, switch 134, terminal 136 (when switch 134 is in its left position), to the plus power supply terminal. Thus if switch 134 is placed in its left position connecting its terminal 133 and 136 the relay 130 will be energized and will raise its armatures 137, 138, 139, 140 to disconnect these from the lower contacts 145, 146, 147, 148 respectively and connect the armatures to the upper contacts 141, 142, 143, 144 respectively.

With the switch 134 in its right position as shown in Fig. 5 however, connecting terminal 133 with the off position terminal 135, the relay 130 will be deenergized and its armatures will be in their lower position disconnecting the upper contacts and connecting the lower contacts as shown in Fig. 5.

The core and the lower side of the output winding 19 of the transformer 18—19 are connected together and to ground wire 28 in Fig. 5 as in Fig. 4 but in Fig. 5 the lower side of the input winding 18 is connected via wire 149 through armature 137 of relay 130, and via lower contact 145, wire 155, lower contact 146, armature 138, wire 150, junction 151, to ground at ground wire 28 instead of being connected to ground via wires 22 and 26 directly as in Fig. 4 and instead of being connected to terminal 17 and to the output winding 19 as in Fig. 4. Thus the lower side of the input winding is connected directly to ground in the arrangement of Fig. 5 only when the relay is in its lower or deenergized position with switch 134 in its off position as shown. The meter M is connected via wires 152—153 to armatures 139 and 140 respectively so that in the lower or deenergized position of relay 130, corresponding to the off position of switch 134, the meter M will be connected across the lower contacts 147 and 148 which are connected respectively via wires 157 and 158 to tap 126 and resistance 129 as in Fig. 4.

Thus in the off position of the switch 134 the input winding is connected to ground and the meter is connected to the same points in the circuit as in Fig. 4 through the armatures and contacts of relay 130 so that the meter M will read speed, terminal 17 being connected to ground as shown in Fig. 3. In the upper position or energized position of relay 130 corresponding to the on position of switch 134, the lower side of the input winding 18 will be disconnected from ground directly and will be connected through the meter M to ground so as to read the average value of the input current rectified by the crystal 15, which is a measure of the output of the transmitting antenna TA if conditions of reflection are constant. The latter connection is accomplished in the upper position of the armatures 137, 138, 139, 140 by cross connection of contacts 141 and 143 by wire 154, and cross connection of contacts 142 and 144 by wire 136. Thus in the upper position of the armatures the lower side of the input transformer winding 18 is connected via wire 149, armature 137, contact 141, wire 154, contact 143, armature 139, wire 152, meter M, wire 153, armature 140, contact 144, wire 156, contact 142, armature 138, wire 150, junction 151 to ground wire 28.

It will be appreciated that a multipole or gang type switch could be used to transfer all of the armature circuits in place of using the relay 130 and a single switch 134 as shown in Fig. 5 if desired, without departing from the invention as defined in the claims.

Fig. 6 shows a modification of the circuit of Fig. 4 to provide expanded gain of the amplifier action once a signal has been received. Because of the variable nature of the reflecting surfaces as a vehicle travels toward the speed meter it has been found that the amplitude of the received signal may occasionally vary sufficiently for the limiter in the amplifier to go in and out of stable operation as the vehicle approaches, thus providing a momentary interruption of the speed indication, especially if the speed meter is operating at its maximum range of detection. This effect can be eliminated at a small sacrifice in over all range of the operating zone along the roadway for speed measurement or detection by providing a circuit which will have two stable conditions of operation. The first condition of operation exists when there is practically no signal being received by the antenna, under which condition the overall gain of the amplifier stage is held to some reduced value. Upon receiving a signal through the amplifier and limiter of sufficient magnitude to operate the limiter the amplifier is switched to the second condition of operation under which the gain of the amplifier is materially increased.

The circuit of Fig. 4 or modified by Fig. 6 provides operation such that, once having received the signal from a vehicle of sufficient magnitude to give the proper speed indication, the gain of the amplifier is maintained at a higher value and thereby the speed indication is not lost if there is a decrease in the intensity of the reflected waves from the vehicle. At such time as the vehicle passes the speed meter or approaches the limits of the operating zone the amplitude of the signal will decrease and the gain of the amplifier will be reduced as the indication of the speed is being cut off.

A further feature of Fig. 6 is addition of a relay R to indicate the presence of a moving vehicle within the operating range of the apparatus along the traffic path, thus serving as a detector of presence of a moving vehicle in this operating zone.

In the circuit modification in Fig. 6 the lower sides of the input transformer windings 18—19 are separated by the insertion of the capacitor 162 instead of being directly connected as in Fig. 4. In Fig. 6 the winding 18 and the core are connected to ground via wire 160 from junction 25, and a connection is made from junction 161 between capacitor 31 and the lower end of winding 19, via wire 163, junction 164 to one side of capacitor 162, the other side of this capacitor being connected to ground wire 28. Also in Fig. 6 the cathode of tube 30 is connected via wire 166 directly to ground wire 28 to eliminate the self bias provided by resistor 33 and capacitor 34 in Fig. 4. Fig. 6 adds a connection from junction 164 to a potential divider circuit via diode 170 to a new junction 171 on wire 93 of Fig. 4.

The operation of the circuit of Fig. 6 is as follows: Assume that there is no signal coming through the amplifier of sufficient magnitude to operate limiter 70 and under this condition the plate of the limiter to which is connected wire 93 will be at some low positive voltage with respect to ground. This voltage is passed through wire 93, junction 171, diode 170, junction 172 to capacitor 173 connected between junction 172 and ground wire 28, and thus charges up capacitor 173 to substantially the potential of wire 93. A potential divider comprising resistors 168 and 178 in series is connected from junction 172 via wire 169, resistor 168, junction 174, wire 175, junction 176, resistor 178 to a high minus potential minus VI, which provides at junction 174 between the resistors a relatively large minus voltage with respect to ground. This potential is applied thru resistor 167 wires 165 and 163 and the secondary of the input transformer 19 to the grid of the first amplifier tube 30. Amplifier tube 30 is of the conventional variable mutual conductance type and provides a higher mutual conductance for signals near zero bias than for signals operating on relatively large negative bias. This large bias at the junction 174 of resistors 168—178 produces low mutual conductance. This low sensitivity operating point on tube 30 holds the overall gain of the amplifier tube to a small value until such time as a signal of sufficient magnitude is passed through to and causes the limiter tube to go through its normal full excursion of plate voltage.

The potential of wire 93 in the plate circuit of the limiter follows the signal and goes alternately to the full plate supply potential and a fixed lower potential. These potentials are applied through the diode 170 to condenser 173 which operates as a peak measuring circuit, and the potential across capacitor 173 now becomes approximately the full potential of the B+, and when applied through potential divider 168—178 produces a new voltage at junction 174 of relatively small negative value. This new voltage is applied as the operating potential for the control grid of the variable mu tube 30 through the grid return circuit and thus causes the gain of the variable mu tube to be increased.

Reduction in amplitude of the received signal as a vehicle approaches will not be enough to overcome the marked increase in the gain of the amplifier and therefore sufficient signal will be maintained at the grid of the limiter tube 70 to provide satisfactory operation until such time as the signal reduces itself to a value such that the limiter can no longer function. The potential of wire 93 then will no longer alternate to its high value of approximately B+ and therefore the potential at condenser 173 will drop, which drop will in turn be passed on through the potential divider 168—178 and the decoupling filter comprising resistor 167 and capacitor 162 to the grid of the variable mu tube and the system will be switched back to its relatively insensitive condition of operation. The time constant of the capacitor 173 and potential divider 168, 178 in conjunction with the time constant of the decoupling filter resistor 167 and condenser 162 may be normally chosen such that the overall time constant operating in the switching of the amplifier from one condition of sensitivity to another will be of the order of one-half second. A circuit including a high resistance 177 is connected between junction 176 and ground wire 28 at junction 179 to reduce the magnitude of the shift in the potential at junction 174. This circuit passes through a switch 212 and where the apparatus is employed solely as a speed meter this switch 212 is in the position shown in Fig. 6 connecting terminals 211 and 213 to connect resistor 177 directly to ground wire 28.

However if it is desired to add the feature of detection of a moving vehicle as such or to use the apparatus essentially as a moving vehicle detector the switch 212 may be moved to its other position connecting terminals 211 and 214 to include relay coil R in series with resistor 177 between junction 176 and ground wire 28 at junction 210. Relay coil R and its armature-contact group 215 comprise a relay preferably of the sensitive type and having a low resistance compared to resistor 177 so as not to affect materially the total resistance of this series circuit.

Relay coil R controls the armature and contact group 215 normally maintaining the armature and contact in engagement when the coil is deenergized and separating the armature and contact upon energization of the relay coil by sufficient potential difference between junction 176 and junction 210. In the absence of any appreciable beat frequency signal, as in the absence of any vehicle moving at appreciable speed, there will be sufficient potential difference between junctions 176 and 210 and thus sufficient current flowing through relay coil R to energize this coil to separate the armature from its associated contact, but upon receiving any appreciable beat frequency signal as in the presence of a vehicle traveling at some appreciable speed, say at least two to three miles per hour for example, the effect of the Fig. 6 circuit for expanding the amplifier gain is to reduce the potential difference between junction 176 and junction 210 to an insignificant value as compared with the previously described potential difference there, and thus to deenergize relay coil R and bring its armature and contact into engagement as shown. Thus the armature-contact group 215 provides for external connection a translation of the presence or absence of a vehicle traveling along the traffic path at appreciable speed by its closed condition or open condition respectively.

Fig. 7 shows an alternate circuit arrangement for the output stage involving tube 120 and meter M of Fig. 4, the modification in Fig. 7 substituting dual triode 180 and adding output terminals 200 and 201 and showing this part of the circuit in simplified form without switch 109, and also showing provision of a relay having a coil S and associated armature-contact group 219 with the coil S connected to a part of the output through an adjustable resistance 216 to provide an indication of a vehicle traveling along the traffic path at more than a substantially predetermined speed, which may be a relatively high speed to indicate a vehicle exceeding a speed limit for example or may be a very low speed of the order of two or three miles per hour as an alternative means of indicating presence of a vehicle traveling along the traffic path at any appreciable speed.

The circuit of Fig. 7 modifies Fig. 4 by replacing that part of the circuit of Fig. 4 to the right of the junction 107 and capacitor 106 as illustrated. Wire 103 from anode of diode 101 may be connected to ground wire 28 as shown where the speed detector is operating on ordinary traffic speed range. The dual triode 180 has its anodes connected on a wire 181 to junction 182 on wire 41 and has its control grids connected to junction 107 of Fig. 4 directly via wire 183, omitting the switch 109 and its connections and capacitor 115 of Fig. 4. One cathode of tube 180 is connected via junction 202, resistor 184, junction 203, resistor 185, tap 186 on variable resistor 187, the latter resistor being connected between ground wire 28 at junction 188 and a relatively high negative voltage source minus V2, via wire 189, junction 190, wire 191. The other cathode of tube 180 is connected via resistor 192, junction 197, resistor 193, tap 194 on variable resistor 195, which is connected from ground wire 28 via wire 196, junction 190, wire 191 to minus V2. Output terminals 200 and 201 are connected to junctions 202 and 203, respectively. Meter M is connected from junction 197 via wires 198 and 199 to ground wire 28.

In practice it is highly desirable in some cases to operate the measuring meter M with one terminal at ground potential. The change in potential in the grid circuit at the output tube 180 which appears across capacitor 106 and at wire 183 would produce a change in the meter output. To improve the linearity in the measuring circuit it is desirable to have in the cathode follower circuit a reasonable cathode current flowing through the circuit at all times. This current can be returned to a negative voltage minus V2 through resistor 193 thereby leaving the potential of point 197 at ground potential for the condition of no signal on wire 183. By making resistor 193 large as compared with the internal resistance of meter M, a very high percentage of the change in cathode current for a change in the voltage at the grid will flow through meter M to produce an indication of the potential change at wire 183. Tap 194 on potentiometer 195 provides means whereby the negative sources of potential for return of the quiescent cathode current can be varied to take care of the normal differences in quiescent cathode curent for production tubes.

The other triode element in tube 180, whose plate is connected to B+ and whose grid is tied to the previous mentioned 183 circuit, is for the purpose of making available output terminals providing a voltage characteristic of the beat frequency for connection to a remote meter or recording or indicating device for example. Terminal 200 provides with respect to ground a voltage change substantially representative of any change in the potential at the grid circuit connected to wire 183. Terminal 201 provides with respect to ground approximately the same type of output voltage, but has its no signal or quiescent voltage approximately at ground potential. This is accomplished by means of potentiometer 187 which is similar to the one described for the meter M.

Connection of any high impedance auxiliary device would be made between terminal 200 and ground wire 28, and connection of any relatively low impedance auxiliary device would be made between terminal 201 and ground wire 28.

One type of apparatus which may be connected to the output terminal 200 is a relay adjusted to pull up its armature only above a closely predetermined voltage level for example, and depending on the voltage operating level for which the relay is adjusted the relay will serve as a detector of a vehicle moving at any appreciable speed along the traffic path or as a detector of a vehicle exceeding a given higher speed such as an established speed limit for example.

Such a relay may comprise the coil S and its associated armature and contact group 219, as shown in Fig. 7, the relay coil S being connected in series with an adjustable resistor 216, from output terminal 200, via wire 204, adjustable resistor 216, wire 217, relay coil S, wire 218 to ground wire 28. Its armature-contact group 219 is normally open with the armature and contact separated when the relay coil S is deenergized, and the armature-contact group is closed with the armature and contact in engagement when the relay coil S is energized.

When serving as a detector of a vehicle traveling above some desired high level of speed the resistor 216 is adjusted to a relatively high value for energization of the relay coil S at the high output voltage for such speed, and when serving as a detector of any vehicle having appreciable speed the resistor 216 is adjusted to a low value for energization of the relay coil S at the low voltage output characteristic of the desired low value of speed to be employed as a minimum speed for detection, the output voltage being substantially proportional to the beat frequency caused by speed over the ordinary range of traffic speeds.

Thus the armature-contact group 219 provides for external connection a translation of the presence or absence of a vehicle traveling along the traffic path above some preestablished speed by its closed condition or open condition respectively, and by selection of such preestablished speed at a very low value provides a translation of presence or absence of a moving vehicle traveling at appreciable speed by such closed or open condition respectively.

Fig. 8 shows one form of antenna arrangement for increasing the transmission of the microwaves in the desired general direction along the roadway or traffic path. In Fig. 8 the metal plate 205 serves as a reflector backing up the antenna arrays and serving as a mounting for them. The transmitting antenna TA is shown in the form of an array and the receiving antenna RA is shown as a second similar array in Fig. 8 and these antennas are arranged in collinear alignment to reduce direct transmission between them.

Referring to the transmitting antenna array TA in Fig. 8 as representation of TA and RA there are two driven half-wave dipole antenna elements TA1 and TA2 substantially one-half wave length apart and driven in phase by the microwave generator shown in Fig. 3. These elements TA1 and TA2 are located about one quarter wave length from the backing reflector 205.

Parasitic directive antenna elements 206 and 207 are located in front of the two driven elements TA1 and TA2 and may be supported as shown by means of a stud 208 projecting forward from the backing plate 205. These directive elements may be spaced about one quarter wave length in front of the driven elements TA1 and TA2 and are somewhat smaller in size than the driven elements for good results, as is well known to those skilled in the art.

Referring again to Fig. 1, it will be understood that for simplicity of illustration the interception of the microwave beam by an approaching vehicle on the near side of the roadway has been shown and the direction of the microwave beam has been shown at a slight angle from the side of the road toward approaching vehicles over a length of travel or operating zone which may be up to 200 to 300 feet long for example, or over a shorter distance as desired by adjusting the sensitivity of the indicator circuit but that the degree of concentration or spread of the beam is determined by the amount of directivity or focusing action of the antenna array or antenna reflector or antenna lens employed and the beam spread can be increased or the angle with the road increased somewhat to have vehicles on the opposite side of the road and proceeding away from the speed meter detected and their speed indicated. If the angle with the road is increased very much however the meter should be calibrated for a higher speed reading for a given beat frequency or the tap 126 on variable resistor 125 in Fig. 4 moved to the left to reduce the resistance in the meter circuit to compensate for the lower beat frequency component in the direction of the beam as the result of the vehicle's speed at an angle to the beam. Since the received beat frequency is proportional to the product of the cosine of the angle and the speed of the vehicle along the roadway it is desirable to direct the beam at a relatively small angle to the roadway or to have a very narrow beam for any given setting of the meter M so that the vehicle's speed is not measured over too long a travel distance unless the beam has a small angle with respect to the roadway.

It will also be appreciated in this connection that with a relatively narrow beam of transmitted microwaves, the antennas may be located relatively close to the side of the roadway and aimed to direct the beam parallel to the roadway and overlapping the path of approaching vehicles on the near side of the roadway within the operating distance for detection as determined by the threshold control but not extending sufficiently into the path of departing vehicles on the other side of the roadway within such operating distance to detect substantially any of such departing vehicles. Similarly with some further sacrifice in efficiency a somewhat wider beam may be directed at a slight angle away from the roadway so as to have the sharpest drop in microwave field intensity occur between the approaching traffic path and the departing traffic path so as to detect approaching vehicles and to minimize any detection of departing vehicles. It will also be understood that if the speed meter is turned around so that the microwave beam is directed to the right toward departing vehicles in the near by lower side of the roadway, the detection and measurement of speed of vehicles proceeding in the direction of arrow D in Fig. 1 but departing beyond the speed meter will be emphasized.

In some cases it may be desired to emphasize the detection or measurement of the speed of vehicles travelling on one side of the roadway only and in other cases it may be desired to emphasize the detection or measurement of the speed of vehicles on both sides of the roadway and it will be understood that one or the other operation may be emphasized as desired by the use of an antenna arrangement and position for the desired beam angle and direction.

In Fig. 1 the antennas are shown exposed on the outside of the box B for clearness of illustration but it will be understood that the antennas may be enclosed by a cover of low reflecting power for microwaves and spaced approximately one half wave length from the antennas.

In the above described embodiments, various circuit element values and tubes may be used and I do not intend to limit myself to any specific circuit element values or any particular type of tubes. However in apparatus embodying the invention the following circuit values and tubes have been found satisfactory for the usual range of speed of vehicle traffic on streets and highways, employing microwaves of a fixed frequency of approximately 3000 megacycles.

The ultra high frequency oscillator tube and cavity of Fig. 3 may be the type 707B and associated Navy type cavity for 3000 megacycles and the crystal detector may be type 1N21B.

In Fig. 4 tubes 30, 50, 70 and 120 may be type 6SJ7 and the tube 100 may be type 6AL5. In this figure also capacitor 31 may be of .002 mfd., resistance 33 of 2000 ohms, capacitor 34 of 25 mfd., resistor 36 of 200,000 ohms, resistor 39 of 50,000 ohms, resistor 40 of 25,000 ohms, resistor 43 of 800,000 ohms, and capacitor 45 of 0.1 mfd. Capacitor 46 may be of .02 mfd., resistor 51 of 600,000 ohms, capacitor 53 of 16 mfd., resistor 56 of 1500 ohms, capacitor 57 of 25 mfd., resistance 59 of 200,000 ohms, resistor 62 of 800,000 ohms, and capacitor 64 of 0.1 mfd. Capacitor 67 may be of .05 mfd., resistor 69 of 200,000 ohms, capacitor 73 of 8 mfd., resistor 75 of 2 megohms, potentiometer 78 of 150,000 ohms, resistor 81 of 15,000 ohms, resistor 84 of 50,000 ohms, resistor 88 of 100 ohms, resistor 89 of 200,000 ohms, capacitor 92 of 10 mfd., capacitor 94 of .0005 mfd., capacitor 95 of .0003 mfd., resistor 98 of 1 megohm, capacitor 99 of .05 mfd. Resistor 105 may be of 1 megohm, capacitor 106 of .05 mfd., capacitor 115 of .05 mfd., resistor 117 of 50,000 ohms, resistor 119 of 10,000 ohms, adjustable resistor 125 total of 200 ohms, and resistor 129 of 10 ohms. A 1 ma. 50 ohm meter may be employed for meter M.

In the Fig. 6 modification of Fig. 4 capacitor 162 may be of .01 mfd., resistor 167 of 1 megohm, resistor 168 of 2 megohms, capacitor 173 of .05 mfd., resistor 177 of 1 megohm, and resistor 178 of 70,000 ohms and rectifier tube 170 may be one-half of a diode type 6AL5 and tube 30 may be type 6SK7 instead of 6SJ7 as in Fig. 4. Relay coil R may have a resistance of 2000 ohms.

In Fig. 7 the dual triode tube may be type 6SL7, and resistor 184 may be of 8000 ohms, resistor 185 of 100,000 ohms, resistor 187 of 150,000 ohms, resistor 192 of 10,000 ohms, resistor 193 of 100,000 ohms, and resistor 195 of 150,000 ohms. Adjustable resistance 216 may have a total of 5000 ohms and relay coil S a resistance of 1000 ohms.

Some variations and modifications of the speed meter have been illustrated and described and it will be obvious to those skilled in the art that other changes in the form, arrangement and connections of the various elements of the complete apparatus may be made without departing from the spirit of the invention as defined by the claims.

I claim:

1. A speed meter for determining the speed of a vehicle moving along a roadway including a microwave transmitter and antenna directing a beam of microwaves along the roadway so as to have a part of such waves reflected back from a vehicle moving along the roadway, a microwave receiver and antenna arranged to receive and mix microwaves directly from said transmitter and said reflected microwaves to provide a microwave output having a difference beat frequency component caused by and substantially proportional in frequency to the speed of such vehicle along the road, a microwave detector for separating said beat frequency component, an amplifier and amplitude limiter for such beat frequency to provide output voltage pulses of substantially uniform amplitude at such beat frequency, a converter for converting said voltage pulses to an output voltage value proportional to such beat frequency, a meter, and switching means having one position for connecting said meter to the output of said converter to measure such output voltage to indicate the speed of the vehicle and an alternative position for connecting said meter to said detector to measure the amplitude of microwave input to the receiver for testing purposes.

2. An apparatus for determining the speed of a body moving along a path of travel including a microwave transmitter and receiver system for directing a beam of microwaves along said path toward said moving body and for receiving microwaves reflected back along said path from said moving body, and including means combining the transmitted and received waves to provide beat frequency waves having a frequency substantially proportional to and caused by the speed of such moving body along said path, a detector for such beat frequency waves, an amplifier for such beat frequency, an amplitude limiter providing output pulses at such beat frequency, a converter providing an output voltage proportional to such beat frequency and output terminals for such output voltage for connection of a meter to measure such output voltage as an indication of such speed, and means including a switch having two positions and a circuit including a capacitor and a rectifier connected in series in one position of said switch to maintain for some time the highest attained output voltage for any moving body to hold for observation its maximum measured speed and another circuit including a capacitor and a lower resistance shunt connected in another position of said switch to provide an output voltage following closely any changes from moment to moment in the speed of such body and any cessation of speed indicating signal due to passage of such body from the beam of microwaves.

3. Apparatus for determining the speed of a vehicle moving along a roadway including a microwave transmitter and antenna directing a beam of microwaves along the roadway so as to have a part of such waves reflected back from a vehicle moving along the roadway, a microwave receiving antenna arranged to receive and mix microwaves directly from said transmitter and said reflected microwaves to provide a microwave output having a difference beat frequency component caused by and substantially proportional in frequency to the speed of such vehicle along the roadway, a microwave detector for separating said beat frequency component, an amplifier and amplitude limiter for such beat frequency to provide output voltage pulses of substantially uniform amplitude at such beat frequency, a converter for converting said voltage pulses to an output voltage value proportional to such beat frequency, a meter, and switching means having one position for connecting said meter to the output of said converter to measure such output voltage to indicate the speed of the vehicle and an alternative position for connecting said meter to said detector to measure the amplitude of microwave input to the receiver for testing purposes.

4. In combination, means transmitting a beam of microwaves from a test station along a path of travel toward a body moving along said path, means at said test station for receiving a part of such microwaves reflected from said moving body, means mixing said reflected waves received at said test station with a part of said transmitted waves at said test station to provide a beat frequency substantially proportional to the speed of said moving body along said path, means for translating such beat frequency output a voltage output whose voltage is characteristic of such beat frequency, a meter, and switching means having one position for connecting said meter to the voltage output of said beat frequency translating means to measure such voltage to indicate the speed of such body and an alternative position for connecting said meter to such beat frequency output to measure the amplitude of microwave input to said receiving means for testing purposes.

5. Apparatus for determining the speed of a body moving along a path of travel including a microwave transmitter and receiver system for directing a beam of microwaves along said path toward said moving body and for receiving microwaves reflected back along said path from said moving body, and including means combining the transmitted and received waves to provide beat frequency waves having a frequency substantially proportional to and caused by the speed of such moving body along said path, means for translating such beat frequency into an output voltage characteristic of such beat frequency, output terminals for such output voltage for connection of a meter to measure such output voltage as an indication of such speed, and means including a switch having two positions and a circuit including a capacitor and a rectifier connected in series in one position of said switch to maintain for some time the highest attained output voltage for any moving body to hold for observation its maximum measured speed and another circuit including a capacitor and a lower resistance connected to another position of said switch to cause such output voltage to follow closely any changes from moment to moment in the speed of such body and any cessation of speed indicating signal due to the passage of such body from the beam of microwaves.

6. Apparatus for determining the speed of a body moving along a path of travel including a microwave transmitter and receiver system for directing a beam of microwaves along said path toward said moving body and for receiving microwaves reflected back along said path from said moving body, and including means combining the transmitted and received waves to provide beat frequency waves having a frequency substantially proportional to and caused by the speed of such moving body along said path, means for translating such beat frequency into an output voltage characteristic of such beat frequency, output terminals for such output voltage for connection of a meter to measure such output voltage as an indication of such speed, control circuit means connectable to said output to maintain for some time the highest attained output voltage for any moving body to hold for observation for such time its maximum measured speed, another control circuit means connectable to said output to cause such output voltage to follow closely any changes from moment to moment in the speed of such body and any cessation of speed indicating signal due to passage of said body from the beam of micro-waves as indicated by corresponding changes in such beat frequency, and switch means for alternative connection of one or the other of said control circuit means.

7. In combination means transmitting microwaves of constant frequency from a point along a traffic path toward a vehicle traveling along such path so as to have some of the microwaves reflected from said vehicle toward said point and receiving and mixing at said point such transmitted and reflected waves to provide a beat frequency proportional to the speed of said vehicle along such path, means for translating such beat frequency into an output voltage proportional to such beat frequency and means including a relay operating responsive to such output voltage only beyond a substantially predetermined voltage level corresponding to the lowest level of vehicle speed ordinarily experienced along said path for detecting the presence of a vehicle traveling along such path at some appreciable speed as distinguished from all stationary bodies.

8. A speed meter for determining the speed of a body moving along a path of travel including a micro wave transmitter and receiver system for directing a beam of micro waves along said path toward said moving body and for receiving micro waves reflected back along said path from said moving body, and including means combining the transmitted and received waves to provide beat frequency waves having a frequency substantially proportional to and caused by the speed of such moving body along said path, a micro wave detector for separating such beat frequency waves, amplifier and limiter means for such beat frequency, a frequency meter connected to the output of such amplifier-limiter means to indicate the speed of said moving body in accordance with such beat frequency, and a threshold response control circuit connected to control said amplifier-limiter means to reduce its output in relation to its input at low input signal amplitude approximating extraneous noise signal amplitudes to require at least a substantial minimum amplitude of beat frequency input to said amplifier-limiter means for providing sufficient output therefrom to obtain indicating operation of the frequency meter.

9. A speed meter as in claim 8 in which said threshold response circuit includes a limiter tube having a control grid for providing full signal output at negative grid bias and substantial blocking of signal output at zero and positive grid bias, and a control circuit for applying positive potential to the control grid of said limiter tube in absence of a substantial input beat frequency signal amplitude to require such substantial minimum input signal amplitude to overcome such positive potential to provide such indicating operation output.

10. A speed meter as in claim 8 and including a signal expander circuit for increasing the amplification of said amplifier in response to output from said limiter to maintain the meter indication against any minor momentary decrease in beat frequency signal strength as the body travels along the beam of micro waves.

11. Apparatus for determining the speed of a body moving along a path of travel including a microwave transmitter and receiver system for directing a beam of microwaves of constant frequency along said path toward said moving body and for receiving microwaves reflected back along said path from said moving body and including means for combining the transmitted and received waves to provide beat frequency waves having a frequency substantially proportional to and caused by the speed of such moving body along said path, a microwave detector for detecting said beat frequency from said mixed microwaves and providing voltage waves of such beat frequency, an amplifier for such beat frequency voltage waves, an amplitude limiter for providing output voltage pulses of substantially uniform amplitude at such beat frequency from the amplified beat frequency voltage waves, a converter for providing a direct current output voltage proportional to such beat frequency from such output voltage pulses, output terminals for such output voltage for connection of a meter to measure such output voltage as an indication of such speed, and a signal expander circuit for increasing the amplification of said amplifier at a rapid rate in response to increasing amplitude of the beat frequency signal input approximating a desired minimum signal amplitude sufficient to provide a constant output pulse magnitude from said limiter to provide one stable condition of no output at input signal levels insufficient for full limiter action and another stable condition of substantial output at input signal levels sufficient for full limiter action, whereby the meter indication will be maintained against momentary decrease in beat frequency signal strength as the body travels along the beam of micro waves.

12. Apparatus for determining the speed of a body moving along a path of travel including a microwave transmitter and receiver system for directing a beam of microwaves of constant frequency along said path toward said moving body and for receiving microwaves reflected back along said path from said moving body and including means for combining the transmitted and received waves to provide beat frequency waves having a frequency substantially proportional to and caused by the speed of such moving body along said path, a microwave detector for detecting said beat frequency from said mixed microwaves and providing voltage waves of such beat frequency, an amplifier for such beat frequency voltage waves, an amplitude limiter for providing output voltage pulses of substantially uniform amplitude at such beat frequency from the amplified beat frequency voltage waves, a converter for providing a direct current output voltage proportional to such beat frequency from such output voltage pulses, and output terminals for such output voltage for connection of a meter to measure such output voltage as an indication of such speed, and said amplifier including a variable mutual conductance tube and a control circuit between the output of said limiter and the control grid of said tube to control the amplification of said tube in response to the magnitude of the output of said limiter for rapidly increasing the amplification in response to any increasing amplitude of the beat frequency input approximating a desired minimum signal amplitude sufficient to provide a constant output pulse magnitude from said limiter.

13. In apparatus for determining the speed of a body moving along a path of travel and having a micro wave transmitter and receiver system for directing a beam of micro waves of constant frequency along said path toward said moving body and for receiving micro waves reflected back along said path from said moving body and means for combining the transmitted and received waves to provide beat frequency waves having a frequency substantially proportional to the speed of such moving body along said path and means for translating said beat frequency waves into a direct current voltage proportional to such speed and readable by a direct current voltmeter for indication of such speed; said translating means including a detector for separating said beat frequency waves from said combined waves, an amplifier for said beat frequency waves, a limiter connected to the output of said amplifier to provide output voltage pulses of uniform amplitude and of frequency corresponding to such beat frequency waves, an amplification control circuit for said amplifier for applying a part of the output of said limiter to the input of said amplifier to increase its amplified output and a conversion circuit connected to the output of said limiter to convert said voltage pulses to such direct current voltage.

14. In apparatus for determining the speed of a body moving along a path of travel and having a micro wave transmitter and receiver system for directing a beam of micro waves of constant frequency along said path toward said moving body and for receiving micro waves reflected back along said path from said moving body and means for combining the transmitted and received waves to provide beat frequency waves having a frequency substantially proportional to the speed of such moving body along said path and means for translating said beat frequency waves into a direct current voltage proportional to such speed and readable by a direct current voltmeter for indication of such speed; said translating means including a detector for separating said beat frequency waves from said combined waves, an amplifier for said beat frequency waves, a limiter connected to the output of said amplifier to provide output voltage pulses of uniform amplitude and of frequency corresponding to such beat frequency waves, and a conversion circuit for converting said output voltage pulses into a direct current output voltage proportional to such beat frequency, said circuit including a capacitor, a diode and a load resistor in series across the output of said limiter for charging said capacitor by said voltage pulses, and a second capacitor in shunt with said load resistor, and a second diode connected in reverse polarity with respect to the first named diode and between said first named capacitor and a small positive reference potential for discharging said first named capacitor between such voltage pulses, whereby said direct current output voltage will appear across said load resistor.

15. In apparatus as in claim 14, a cathode follower circuit including a tube having anode, cathode and control grid, a grid to cathode circuit including said load resistor and a low resistance and a high resistance in series, a cathode to anode circuit including said low and high resistances in series, and a milliammeter and an adjustable resistance connected across said low resistance in said cathode circuit, the reference potential for said second diode being provided by connection of the latter diode to a point between said low and high resistance in the cathode circuit.

16. A combination as in claim 7, and said translating means including a detector for separating the beat frequency waves, an amplifier for said beat frequency waves, a limiter connected to the output of said amplifier to provide output voltage pulses of uniform amplitude and of frequency corresponding to such beat frequency waves, a conversion circuit connected to the output of said limiter to convert said voltage pulses to a direct current output voltage proportional to said beat frequency, a cathode follower circuit having its input connected to the output voltage from said conversion circuit and having a resistor in its cathode circuit, and said relay means including said relay and an adjustable resistance connected across said cathode circuit resistor to be operated by direct current voltage appearing across the latter above a predetermined voltage level corresponding with a desired minimum direct current output voltage for indication of a vehicle traveling above a corresponding desired minimum speed.

17. In combination means for transmitting microwaves of constant frequency from a point along the traffic path toward a vehicle traveling along such path so as to have some of the microwaves reflected from said vehicle toward said point and receiving and mixing at said point such transmitted and reflected waves to provide a beat frequency proportional to the speed of said vehicle along such path, a detector for separating the beat frequency waves, an amplifier for said beat frequency waves, a limiter connected to the output of said amplifier to provide output voltages pulses of uniform amplitude and of frequency corresponding to such beat frequency waves, a conversion circuit connected to the output of said limiter to convert said voltage pulses to a direct current output voltage proportional to said beat frequency, a cathode follower circuit having its input connected to the output voltage from said conversion circuit and having a resistor in its cathode circuit, and relay means including an adjustable resistance and a relay connected across said cathode circuit resistor to be operated by direct current voltage appearing across the latter only above a predetermined voltage level corresponding with a desired minimum direct current output voltage for indication of a vehicle traveling above a corresponding minimum speed.

18. In combination means for transmitting microwaves of constant frequency from a point along the traffic path toward a vehicle traveling along such path so as to have some of the microwaves reflected from said vehicle toward said point and receiving and mixing at said point such transmitted and reflected waves to provide a beat frequency proportional to the speed of said vehicle along such path, a detector for separating the beat frequency waves, an amplifier for said beat frequency waves, a limiter connected to the output of said amplifier to provide output voltage pulses of uniform amplitude and of frequency corresponding to such beat frequency waves, a detector circuit to derive from the output of said limiter a direct current voltage in response to such beat frequency signal, a circuit connecting said direct current voltage to control the amplification of said amplifier for increasing the amplification of said amplifier in response to appreciable output from said limiter, and a relay connected to said last named detector circuit to be controlled by said named direct current voltage to be selectively operated and released in response to output and absence of output from said limiter for detecting the presence of a vehicle traveling along such path at some appreciable speed as distinguished from all stationary bodies.

19. In combination a microwave transmitter and receiver system for directing a beam of microwaves along a roadway toward a moving vehicle and for receiving microwaves reflected back along said roadway from said moving vehicle, means for combining the transmitted and received waves to provide beat frequency waves having a frequency substantially proportional to and caused by the speed of such moving vehicle along said roadway, a microwave detector for separating such beat frequency waves, amplifier and limiter means for such beat frequency waves, a relay controlled by the output of such amplifier-limiter means to be operated by such output when said output becomes substantial to detect presence of a vehicle moving at appreciable speed as distinguished from all substantially stationary objects, a threshold response control circuit connected to control said amplifier-limiter means to reduce its output in relation to its input at low input signal amplitude approximating extraneous noise signal amplitudes to require at least a minimum amplitude of beat frequency output to said amplifier-limiter means for providing sufficient output therefrom to obtain operation of said relay, and a signal expander circuit for increasing the amplification of said amplifier in response to output from said limiter to maintain operation of said relay after initial operation against any minor momentary decrease in beat frequency signal strength as the vehicle travels along the beam of microwaves.

20. A speed meter for determining the speed of a body moving along a path of travel including a microwave transmitter and receiver system for directing a beam of microwaves of constant frequency along said path towards said body, and for receiving microwaves reflected back along said path from said moving body and including means for combining the transmitted and received waves to provide beat frequency waves having a frequency substantially proportional to and caused by the speed of such moving body along said path, a microwave detector for detecting said beat frequency from said mixed microwaves and providing voltage waves of such beat frequency, an amplifier for such beat frequency voltage waves, an amplitude limiter for providing output voltage pulses of substantially uniform amplitude at such beat frequency from the amplified beat frequency voltage waves, a converter for providing a direct current output voltage proportional to such beat frequency from such output voltage pulses, and a meter for measuring such direct current output voltage from said converter as an indication of such speed, and a signal expander circuit for increasing the amplification of said amplifier at a rapid rate in response to increasing amplitude of the beat frequency signal input approximating a desired minimum signal amplitude sufficient to provide a constant output pulse magnitude from said limiter to provide one stable condition of no output at input signal levels insufficient for full limiter action and another stable condition of substantial output at input signal levels sufficient for full limiter action, whereby the meter indication will be maintained against momentary decrease in beat frequency signal strength as the body travels along the beam of microwaves.

21. A speed meter for determining the speed of a body moving along a path of travel including a microwave transmitter and receiver system for directing a beam of microwaves of constant frequency along said path toward said moving body and for receiving microwaves reflected back along said path from said moving body and including means for combining the transmitted and received waves to provide beat frequency waves having a frequency substantially proportional to and caused by the speed of such moving body along said path, a microwave detector for detecting said beat frequency from said mixed microwaves and providing voltage waves of such beat frequency, an amplifier for such beat frequency voltage waves, an amplitude limiter for providing output voltage pulses of substantially uniform amplitude at such beat frequency from the amplified beat frequency voltage waves, a converter for providing a direct current output voltage proportional to such beat frequency from such output voltage pulses, and a meter for measuring such direct current output voltage from said converter as an indication of such speed, and said amplifier including a variable mutual conductance tube and a control circuit between the output of said limiter and the control grid of said tube to control the amplification of said tube in response to the magnitude of the output of said limiter for rapidly increasing the amplification in response to any increasing amplitude of the beat frequency input approximating a desired minimum signal amplitude sufficient to provide a constant output pulse magnitude from said limiter.

22. A portable speed meter for determining the speed of a vehicle moving along a roadway including a microwave transmitter and receiver and antenna system at the side of the roadway for directing a narrow beam of microwaves of constant frequency within a 1,000 to 12,000 megacycle range along the roadway toward vehicular traffic on the same side of the roadway so as to have a part of such waves reflected back from a vehicle moving along the roadway and for receiving and mixing said reflected waves with a portion of such transmitted waves to provide a microwave output having a difference beat frequency component in the audio frequency range caused by and substantially proportional to the speed of such vehicle along the roadway in the ordinary range of vehicular traffic speeds, a microwave crystal detector for separating said audio beat frequency component, an audio frequency amplifier for said beat frequency component, an amplitude limiter for providing output voltage pulses of substantially uniform amplitude at such beat frequency from the amplified beat frequency component, an amplification control circuit for said amplifier for applying a control voltage from the output of said limiter to the input of said amplifier to increase its amplified output in response to output of the limiter, a converter for providing a direct current output proportional to such beat frequency from such output voltage pulses from the limiter, and meter means calibrated in terms of speed for measuring such direct current output from said converter to indicate the speed of the vehicle.

23. A portable speedmeter for determining the speed of a vehicle moving along a roadway including a microwave transmitter and receiver and antenna system at the side of the roadway for directing a narrow beam of microwaves of constant frequency within a 1,000 to 12,000 megacycle range along the roadway toward vehicular traffic on the same side of the roadway so as to have a part of such waves reflected back from a vehicle moving along the roadway and for receiving and mixing said reflected waves with a portion of such transmitted waves to provide a microwave output having a difference beat frequency component in the audio frequency range caused by and substantially proportional to the speed of such vehicle along the roadway in the ordinary range of vehicular traffic speeds, a microwave crystal detector for separating said audio beat frequency component, an audio frequency amplifier for said beat frequency component, an amplitude limiter for providing output voltage pulses of substantially uniform amplitude at such beat frequency from the amplified beat frequency component, an amplification control circuit for said amplifier for applying a control voltage from the output of said limiter to the input of said amplifier to increase its amplified output in response to output of the limiter, a converter for providing a direct current output proportional to such beat frequency from such output voltage pulses from the limiter, and meter means calibrated in terms of speed for measuring such direct current output from said converter to indicate the speed of the vehicle, and a control circuit for said limiter for applying a small potential to the input of said limiter to oppose the input beat frequency signal to the limiter in the absence of any substantial input beat frequency signal amplitude to require a substantial minimum input signal amplitude to overcome such potential to provide operating output from the limiter.

JOHN L. BARKER.

REFERENCES CITED

The following references are of record in the file of this patent:

UNITED STATES PATENTS

| Number | Name | Date |
|---|---|---|
| 2,193,361 | Rice | Mar. 12, 1940 |
| 2,236,893 | Chaffee | Apr. 1, 1941 |
| 2,402,464 | Suter | June 18, 1946 |
| 2,407,644 | Benioff | Sept. 17, 1946 |
| 2,424,263 | Woodyard | July 22, 1947 |
| 2,427,087 | Carlson | Sept. 9, 1947 |
| 2,436,846 | Williams | Mar. 2, 1948 |
| 2,451,822 | Guanella | Oct. 19, 1948 |
| 2,477,567 | Barker | Aug. 2, 1949 |
| 2,490,816 | Kiebert | Dec. 13, 1949 |
| 2,491,542 | Woodyard | Dec. 20, 1949 |
| 2,523,398 | Southworth | Sept. 26, 1950 |
| 2,524,610 | Storm et al. | Oct. 3, 1950 |